US012726634B2

(12) United States Patent
Tsai et al.

(10) Patent No.: US 12,726,634 B2
(45) Date of Patent: Sep. 1, 2026

(54) TEMPLATE-BASED INTRA MODE DERIVATION AND PREDICTION

(71) Applicant: MEDIATEK INC., Hsinchu City (TW)

(72) Inventors: Chia-Ming Tsai, Hsinchu City (TW); Chun-Chia Chen, Hsinchu City (TW); Man-Shu Chiang, Hsinchu City (TW); Yu-Cheng Lin, Hsinchu City (TW); Tzu-Der Chuang, Hsinchu City (TW); Chih-Wei Hsu, Hsinchu City (TW); Ching-Yeh Chen, Hsinchu City (TW); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 11 days.

(21) Appl. No.: 18/854,810

(22) PCT Filed: Apr. 14, 2023

(86) PCT No.: PCT/CN2023/088365

§ 371 (c)(1),
(2) Date: Oct. 7, 2024

(87) PCT Pub. No.: WO2023/198187

PCT Pub. Date: Oct. 19, 2023

(65) Prior Publication Data

US 2025/0260828 A1 Aug. 14, 2025

Related U.S. Application Data

(60) Provisional application No. 63/331,349, filed on Apr. 15, 2022.

(51) Int. Cl.
*H04N 19/159* (2014.01)
*G06T 5/40* (2006.01)
(Continued)

(52) U.S. Cl.
CPC ............ *H04N 19/159* (2014.11); *G06T 5/40* (2013.01); *H04N 19/11* (2014.11); *H04N 19/176* (2014.11); *H04N 19/186* (2014.11)

(58) Field of Classification Search
CPC .. H04N 19/176; H04N 19/186; H04N 19/157; H04N 19/159; H04N 19/11; G06T 5/40
See application file for complete search history.

(56) References Cited

U.S. PATENT DOCUMENTS 11,122,265 B2 9/2021 Moon
12,363,289 B2 * 7/2025 Teng ..................... H04N 19/46
(Continued)

FOREIGN PATENT DOCUMENTS

CN 109328461 A 2/2019
WO WO-2019103542 A1 * 5/2019 ............ H04N 19/70
WO WO-2023014164 A1 * 2/2023 .......... H04N 19/159

OTHER PUBLICATIONS

International Search Report and Written Opinion dated Jun. 20, 2023, issued in application No. PCT/CN2023/088365.
(Continued)

*Primary Examiner* — Tsion B Owens

(74) *Attorney, Agent, or Firm* — McClure, Qualey & Rodack, LLP

(57) ABSTRACT

A method for performing template-based intra mode derivation (TIMD) with enhanced candidate intra-prediction modes is provided. A video coder determines a set of most
(Continued)

probable modes (MPMs) for intra-coding the current block based on intra-prediction modes used to code neighboring blocks of the current block. The video coder determines a template of the current block among already-reconstructed pixels neighboring the current block. The video coder determines a set of candidate intra-prediction modes to include (i) the set of MPMs and (ii) one or more intra-prediction modes neighboring an MPM in the set of MPMs. The video coder derives an intra-prediction mode from the set of candidate intra-prediction modes based on the determined template and the set of candidate intra-prediction modes. The video coder encodes or decodes the current block by using the derived intra-prediction mode to generate an intra-prediction.

14 Claims, 11 Drawing Sheets

(51) Int. Cl.
*H04N 19/11* (2014.01)
*H04N 19/176* (2014.01)
*H04N 19/186* (2014.01)

(56) References Cited

U.S. PATENT DOCUMENTS

| | | | | |
|---|---|---|---|---|
| 2017/0353719 | A1* | 12/2017 | Liu | H04N 19/156 |
| 2019/0166370 | A1* | 5/2019 | Xiu | H04N 19/176 |
| 2019/0222839 | A1 | 7/2019 | Jang | |
| 2021/0014484 | A1 | 1/2021 | Kotra | |
| 2021/0274163 | A1 | 9/2021 | Li | |
| 2023/0090700 | A1* | 3/2023 | Teng | H04N 19/105<br>375/240.02 |
| 2023/0319289 | A1* | 10/2023 | Xiu | H04N 19/11<br>375/240.03 |
| 2024/0179303 | A1* | 5/2024 | Park | H04N 19/176 |
| 2025/0088624 | A1* | 3/2025 | Teng | H04N 19/159 |
| 2025/0247534 | A1* | 7/2025 | Li | H04N 19/105 |

OTHER PUBLICATIONS

Wang, Y., et al.; “EE2-related: Template-based intra mode derivation using MPMs;” Joint Video Experts Team (JVET) of ITU-T SG 16 WP 3 and ISO/IEC JTC 1/SC 29; Apr. 2021; pp. 1-4.

Xiu, X., et al.; “Decoder-side intra mode derivation;” Joint Video Exploration Team (JVET) of ITU-T SG 16 WP 3 and ISO/IEC JTC 1/SC 29/WG 11; Jun. 2016; pp. 1-5.

* cited by examiner

= intra-prediction mode A x = interpolated samples based on intra-prediction mode = intra-prediction mode B x = interpolated samples based on intra-prediction mode Line 1
Line 0
Current Block

TEMPLATE-BASED INTRA MODE DERIVATION AND PREDICTION

CROSS REFERENCE TO RELATED PATENT APPLICATION(S)

The present disclosure is part of a non-provisional application that claims the priority benefit of U.S. Provisional Patent Application No. 63/331,349, filed on 15 Apr. 2022. Content of the above-listed application is herein incorporated by reference.

TECHNICAL FIELD

The present disclosure relates generally to video coding. In particular, the present disclosure relates to intra mode coding of pixel blocks.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for performing template-based intra mode derivation (TIMD) with enhanced candidate intra-prediction modes. A video coder determines a set of most probable modes (MPMs) for intra-coding the current block based on intra-prediction modes used to code neighboring blocks of the current block. The video coder determines a template of the current block among already-reconstructed pixels neighboring the current block. The video coder determines a set of candidate intra-prediction modes to include (i) the set of MPMs and (ii) one or more intra-prediction modes neighboring an MPM in the set of MPMs. The video coder derives an intra-prediction mode based on the determined template and the set of candidate intra-prediction modes. The video coder encodes or decodes the current block by using the derived intra-prediction mode to generate an intra-prediction.

In some embodiments, the video implicitly determines whether to perform TIMD to derive the intra-prediction based on whether a statistical variation of the set of MPMs is greater than a threshold. In some embodiments, the video coder would not perform TIMD if the statistical variation of the MPMs is less than a threshold.

In some embodiments, the one or more intra-prediction modes neighboring an MPM are included in the set of candidate intra-prediction modes when the current block is greater than a threshold size. In some embodiments, the one or more intra-prediction modes neighboring an MPM are not included in the set of candidate intra-prediction modes when the current block is less than the threshold size. In some embodiments, the one of more intra-prediction modes neighboring an MPM are included in the set of candidate intra-prediction modes when a statistical variation of the set of MPMs is less than a threshold value. In some embodiments, the video coder performs DIMD as preprocessing to identify candidate intra-prediction modes for TIMD.

In some embodiments, the set of candidate intra-prediction modes is constrained to exclude one or more intra-prediction modes based on a prediction mode of a neighboring block of the current block. In some embodiments, the set of candidate intra-prediction modes is constrained to be within a predefined range.

The intra-prediction may be for luma or chroma components. In some embodiments, the video coder refines the derived intra-prediction mode and uses the refined intra-prediction mode to generate the intra-prediction. In some embodiments, the video coder refines the generated intra-prediction according to gradient of reconstructed samples neighboring the current block.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Intra Prediction

Intra-prediction method exploits one reference tier adjacent to the current prediction unit (PU) and one of the intra-prediction modes to generate the predictors for the current PU. The Intra-prediction direction can be chosen among a mode set containing multiple prediction directions. For each PU coded by Intra-prediction, one index will be used and encoded to select one of the intra-prediction modes. The corresponding prediction will be generated and then the residuals can be derived and transformed.

Figure 1:
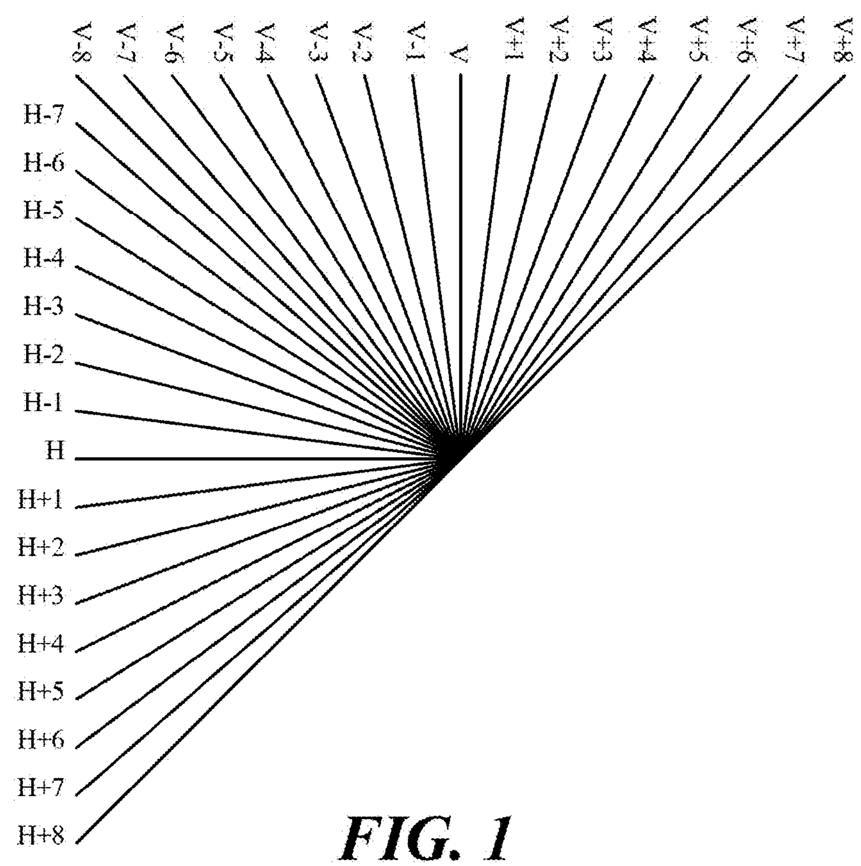
FIG. 1 shows the intra-prediction modes in different directions.

FIG. 1 shows the intra-prediction modes in different directions. These intra-prediction modes are referred to as directional modes and do not include DC mode or Planar mode. As illustrated, there are 33 directional modes (V: vertical direction; H: horizontal direction), so H, H+1~H+8, H−1~H−7, V, V+1~V+8, V−1~V−8 are used. Generally directional modes can be represented as either as H+k or V+k modes, where k=±1, ±2, . . . , ±8. Each of such intra-prediction mode can also be referred to as an intra-prediction angle. To capture arbitrary edge directions presented in natural video, the number of directional intra modes may be extended from 33, as used in HEVC, to 65 direction modes so that the range of k is from ±1 to ±16. These denser directional intra prediction modes apply for all block sizes and for both luma and chroma intra predictions. By including DC and Planar modes, the number of intra-prediction mode is 35 (or 67).

Out of the 35 (or 67) intra-prediction modes, some modes (e.g., 3 or 5) are identified as a set of most probable modes (MPM) for intra-prediction in current prediction block. The encoder may reduce bit rate by signaling an index to select one of the MPMs instead of an index to select one of the 35 (or 67) intra-prediction modes. For example, the intra-prediction mode used in the left prediction block and the intra-prediction mode used in the above prediction block are used as MPMs. When the intra-prediction modes in two neighboring blocks use the same intra-prediction mode, the intra-prediction mode can be used as an MPM. When only one of the two neighboring blocks is available and coded in directional mode, the two neighboring directions immediately next to this directional mode can be used as MPMs. DC mode and Planar mode are also considered as MPMs to fill the available spots in the MPM set, especially if the above or top neighboring blocks are not available or not coded in intra-prediction, or if the intra-prediction modes in neighboring blocks are not directional modes. If the intra-prediction mode for current prediction block is one of the modes in the MPM set, 1 or 2 bits are used to signal which one it is. Otherwise, the intra-prediction mode of the current block is not the same as any entry in the MPM set, and the current block will be coded as a non-MPM mode. There are all-together 32 such non-MPM modes and a (5-bit) fixed length coding method is applied to signal this mode.

The MPM list is constructed based on intra modes of the left and above neighboring block. Suppose the mode of the left neighboring block is denoted as Left and the mode of the above neighboring block is denoted as Above, and the unified MPM list may be constructed as follows:

- When a neighboring block is not available, its intra mode is set to Planar by default.
- If both modes Left and Above are non-angular modes:
  - MPM list→{Planar, DC, V, H, V−4, V+4}
- If one of modes Left and Above is angular mode, and the other is non-angular:
  - Set a mode Max as the larger mode in Left and Above
  - MPM list→ {Planar, Max, Max−1, Max+1, Max−2, Max+2}
- If Left and Above are both angular and they are different:
  - Set a mode Max as the larger mode in Left and Above
  - Set a mode Min as the smaller mode in Left and Above
  - If Max−Min is equal to 1:
    - MPM list→{Planar, Left, Above, Min−1, Max+1, Min−2}
  - Otherwise, if Max−Min is greater than or equal to 62:
    - MPM list→{Planar, Left, Above, Min+1, Max−1, Min+2}
  - Otherwise, if Max−Min is equal to 2:
    - MPM list→{Planar, Left, Above, Min+1, Min−1, Max+1}
  - Otherwise:
    - MPM list→{Planar, Left, Above, Min−1, Min+1, Max−1}
- If Left and Above are both angular and they are the same:
  - MPM list≥{Planar, Left, Left−1, Left+1, Left−2, Left+2}

II. Decoder-Side Intra Mode Derivation (DIMD)

Decoder-Side Intra Mode Derivation (DIMD) is a technique in which two intra prediction modes/angles/directions are derived from the reconstructed neighbor samples (template) of a block, and those two predictors are combined with the planar mode predictor with the weights derived from the gradients. The DIMD mode is used as an alternative prediction mode and is always checked in high-complexity RDO mode. To implicitly derive the intra prediction modes of a blocks, a texture gradient analysis is performed at both encoder and decoder sides. This process starts with an empty Histogram of Gradient (HoG) having 65 entries, corresponding to the 65 angular/directional intra prediction modes. Amplitudes of these entries are determined during the texture gradient analysis.

A video coder performing DIMD performs the following steps: in a first step, the video coder picks a template of T=3 columns and lines from respectively left and above current block. This area is used as the reference for the gradient based intra prediction modes derivation. In a second step, the horizontal and vertical Sobel filters are applied on all 3×3 window positions, centered on the pixels of the middle line of the template. On each window position, Sobel filters calculate the intensity of pure horizontal and vertical directions as $G_x$ and $G_y$, respectively. Then, the texture angle of the window is calculated as:

$$\text{angle} = \arctan(G_x/G_y),$$

which can be converted into one of the 65 angular intra prediction modes. Once the intra prediction modes index of current window is derived as idx, the amplitude of its entry in the HoG[idx] is updated by addition of $$ampl = |G_x| + |G_y|$$

Figure 2:
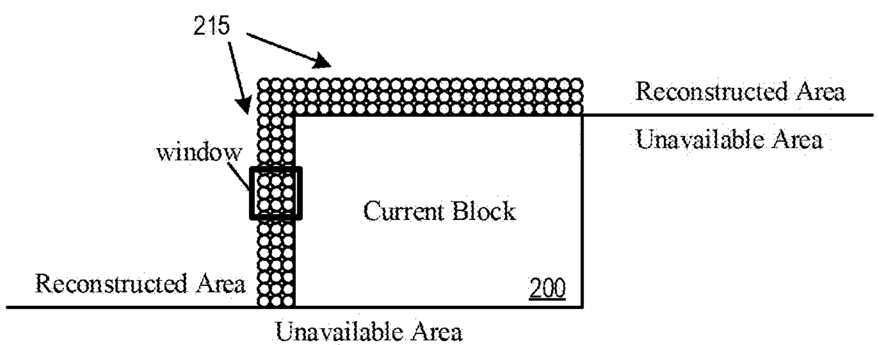
FIG. 2 illustrates using decoder-side intra mode derivation (DIMD) to implicitly derive an intra prediction mode for a current block.
Figure 2:
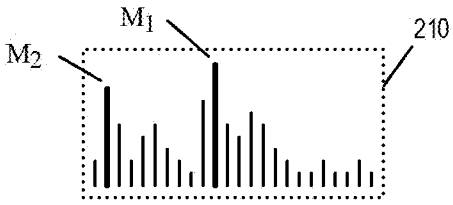

FIG. 2 illustrates using decoder-side intra mode derivation (DIMD) to implicitly derive an intra prediction mode for a current block. The figure shows an example Histogram of Gradient (HoG) 210 that is calculated after applying the above operations on all pixel positions in a template 215 around a current block 200. Once the HoG is computed, the indices of the two tallest histogram bars ($M_1$ and $M_2$) are selected as the two implicitly derived intra prediction modes (IPMs) for the block. The prediction of the two IPMs are further combined with the planar mode as the prediction of DIMD mode. The prediction fusion is applied as a weighted average of the above three predictors ($M_1$ prediction, $M_2$ prediction, and planar mode prediction). To this aim, the weight of planar may be set to 21/64 (~⅓). The remaining weight of 43/64 (~⅔) is then shared between the two HoG IPMs, proportionally to the amplitude of their HoG bars. The prediction fusion or combined prediction for DIMD can be:

$$Pred_{DIMD} = (43 * (w1 * pred_{M1} + w2 * pred_{M2}) + 21 * pred_{planar}) >> 6$$

$$w1 = amp_{M1}/(amp_{M1} + amp_{M2})$$

$$w2 = amp_{M2}/(amp_{M1} + amp_{M2})$$

In addition, the two implicitly derived intra prediction modes are added into the most probable modes (MPM) list, so the DIMD process is performed before the MPM list is constructed. The primary derived intra mode of a DIMD block is stored with a block and is used for MPM list construction of the neighboring blocks.

III. Template-Based Intra Mode Derivation (TIMD)

Template-based intra mode derivation (TIMD) is a coding method in which the intra prediction mode of a CU is implicitly derived by using a neighboring template at both encoder and decoder, instead of the encoder signaling the exact intra prediction mode to the decoder.

Figure 3:
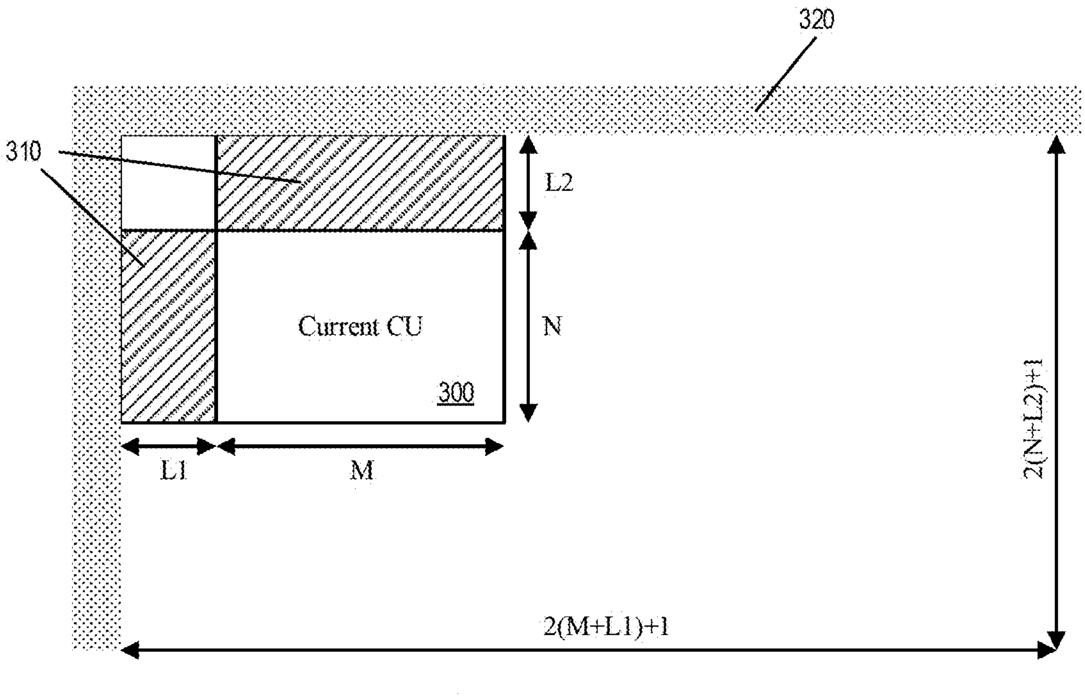
FIG. 3 illustrates using template-based intra mode derivation (TIMD) to implicitly derive an intra prediction mode for a current block.

FIG. 3 illustrates using template-based intra mode derivation (TIMD) to implicitly derive an intra prediction mode for a current block 300. As illustrated, the neighboring pixels of the current block 300 is used as template 310. For each candidate mode, prediction samples of the template 310 are generated using the reference samples, which are in a reference region 320 above and to the left of the template 310. A cost is calculated based on a difference (e.g., SATD) between the prediction and the reconstructed samples of the template. The intra prediction mode with the minimum cost is selected (as in the DIMD mode) and used for intra prediction of the CU. The candidate modes may include 67 intra prediction modes (as in VVC) or extended to 131 intra prediction modes. MPMs may be used to indicate the directional information of a CU. Thus, to reduce the intra mode search space and utilize the characteristics of a CU, the intra prediction mode is implicitly derived from the MPM list.

In some embodiments, for each intra prediction mode in the MPM list, the SATD between the prediction and reconstructed samples of the template is calculated. First two intra prediction modes with the minimum SATD are selected as the TIMD modes. These two TIMD modes are fused with the weights after applying PDPC process, and such weighted intra prediction is used to code the current CU. Position dependent intra prediction combination (PDPC) is included in the derivation of the TIMD modes.

The costs of two selected modes (mode1 and mode2) are compared with a threshold, in the test the cost factor of 2 is applied as follows:

$$costMode2 < 2 * costMode1$$

If this condition is true, the prediction fusion is applied, otherwise only mode1 is used. Weights of the modes are computed from their SATD costs as follows:

$$\text{weight1} = costMode2/(costMode1 + costMode2)$$

$$\text{weight2} = 1 - \text{weight1}$$

IV. Improved Intra Mode Derivation

Some embodiments provide methods for improving the cost computation and signaling syntax of TIMD. In some embodiments, the SATD cost between luma prediction and the reconstruction template (template constructed from reconstructed pixels), and the SATD cost between the chroma prediction and the reconstruction template, are added together as the final cost for deriving the intra mode(s) of TIMD.

A. Additional Candidate Intra-Prediction Modes for TIMD

As mentioned, the TIMD process may examine a limited set of candidate intra-prediction modes (e.g., MPMs of the current block) based on a template of the current block. (A template may be a region of reconstructed samples neighboring the current block.) In some embodiments, in addition to the MPM modes themselves, the TIMD process may also adaptively select from adjacent intra modes of the MPM modes (e.g., a mode in MPM+k, or a mode in MPM−k, where k>0).

Figure 4:
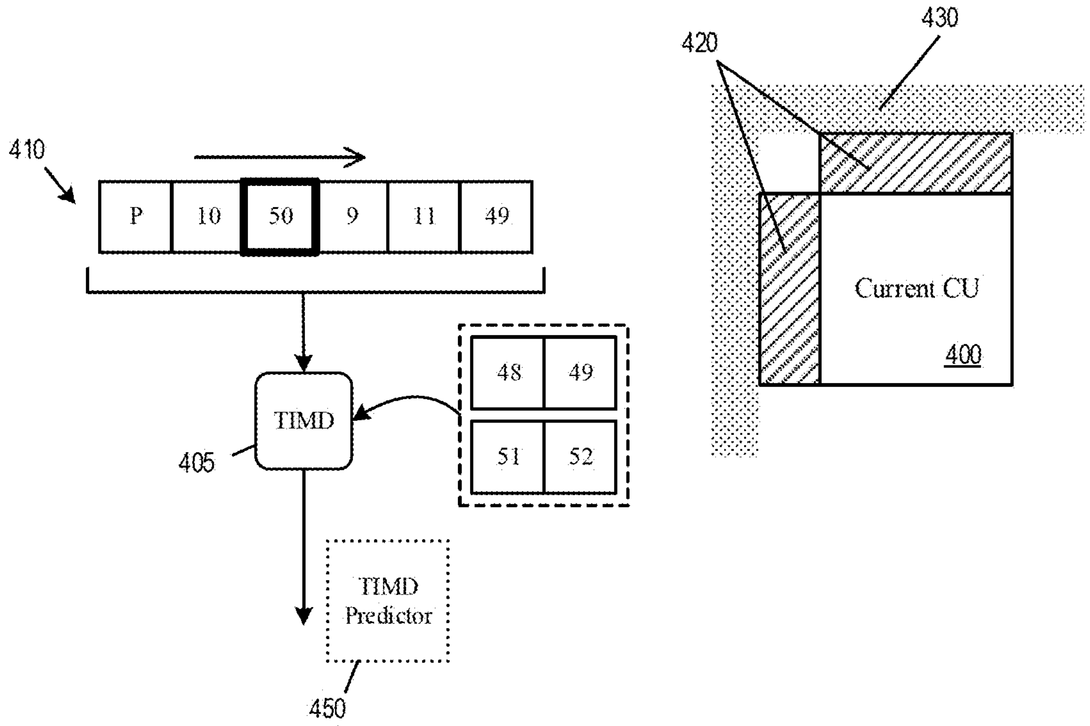
FIG. 4 conceptually illustrates a TIMD process that adaptively selects from adjacent intra modes of most probable modes (MPMs).

FIG. 4 conceptually illustrates a TIMD process that adaptively selects from adjacent intra modes of MPM modes. As illustrated, the video coder initially generates/identifies a set of MPM modes 410 for a current block 400, whose neighboring reconstructed pixels are considered as a template 420 for the current block. The set of MPM modes 410 include the planar mode and several intra-prediction angular modes 10, 50, 9, 11, and 49. A TIMD process 405 considers the set of MPM modes 410 as candidate intra-prediction modes. In addition to MPM modes in the set 410, the TIMD process 405 may also examine or consider adjacent modes of the MPM modes as candidate intra-prediction modes. For example, when considering intra-prediction angular mode 50 as a TIMD candidate, the TIMD process also consider intra-prediction angular modes 48, 49, 51, and 52 (assuming k=2), as TIMD candidates, as these additional modes are neighboring/adjacent modes of the MPM intra-prediction mode 50.

The TIMD process 405 computes a cost for each candidate intra-prediction mode (including neighboring/adjacent modes of MPM modes) based on the template from a template region 420 and a set of reference samples from a reference region 430. Based on the computed costs, the TIMD process 405 may derive one (or more) final intra-prediction mode(s) and generate a TIMD predictor 450 (which is an intra-prediction) for the current block 400 based on the identified final intra-prediction mode(s).

In some embodiments, the number k of adjacent intra modes being available for selection may depend on the current CU size. For example, if TIMD is applied to a small size CU (e.g., CU width+height or CU area is less than a threshold), only the modes in the MPM list are considered as candidate intra-prediction modes for TIMD. On the other hand, if TIMD is applied to a large size CU (e.g., CU width+height or CU area is greater than a threshold), adjacent intra modes of the modes in the MPM list are also considered as candidate intra-prediction modes for TIMD.

B. Implicit TIMD

In some embodiments, TIMD is implicitly applied to the current block. In some embodiments, if the candidate intra modes examined or considered by the TIMD process (e.g., MPMs) are very similar (e.g., statistical variation of MPMs<threshold), TIMD is implicitly disabled. On the other hand, if the candidates intra modes (e.g., MPMs) examined or considered by the TIMD process are not similar (e.g., statistical variation of MPMs>threshold), TIMD is implicitly applied to identify an intra prediction mode.

In some embodiments, the TIMD prediction or process is applied to chroma CUs to implicitly derive intra angular modes for the chroma CU. In some embodiments, if the candidate intra chroma modes considered by the TIMD process include DC, vertical, horizontal, planar, and DM, the TIMD process is applied to derive the final intra angular mode for determining the predictor for the current block. In some embodiments, a flag is used to indicate whether TIMD is used to derive the final intra angular mode. In some embodiments, if the flag is true, the TIMD process is used to derive the final intra angular mode, and the DC, vertical, horizontal, planar, and DM modes are excluded as candidate intra modes for the TIMD process.

In some embodiments, after deriving the intra angular mode by TIMD, the video coder may perform a fine search around the derived intra angular mode to refine the derived intra angular mode. For example, the TIMD process may derive an intra angular mode k that is one of the intra directional modes 0 to 67, and the encoder may search for additional intra modes (i.e., refinement) between (k−1) and (k+1). The encoder may then signal a delta value to indicate the final intra prediction angular mode.

C. Constraint on Candidate Intra Modes for TIMD

In some embodiments, when performing TIMD or DIMD, the video coder may exclude or lower the gradient of the neighboring inter-coded positions when computing gradient histogram or may increase the cost between prediction and reconstruction of inter-coded template.

The candidate intra angular modes for the TIMD process may be further constrained by prediction modes of neighboring blocks. For example, in some embodiments, if the above or top neighboring CU is inter-coded in skip mode, the intra angular modes greater than the diagonal intra angular mode (e.g., mode 66 in 131 intra angular modes, or mode 34 in 67 intra angular modes, or mode 18 in 34 intra angular modes) are excluded from the candidate intra angular modes for TIMD. For another example, in some embodiments, if the left neighboring CU is inter-coded in skip mode, the intra angular modes less than the diagonal intra angular mode (e.g., mode 66 in 131 intra angular modes, mode 34 in 67 intra angular modes, mode 18 in 34 intra angular modes) are excluded from the candidate intra angular modes for TIMD.

In some embodiments, the candidate intra angular modes for TIMD may be further constrained or reduced to a predefined range. Specifically, if the candidate intra angular modes may be drawn from the 67 intra angular modes (i.e., 0, 1, 2, 3, . . . , 67), the video coder may constrain the valid intra angular mode candidates for TIMD to be a subset of these 67 modes (i.e., candidates <67 modes). In other words, the constrained candidates may be {0, 1, 2, 4, 6, 8, . . . , 66}, {0, 1, 3, 5, 7, 9, . . . , 65}, {0, 1, 2, 3, 4, 5, . . . , 34}, {34, 35, 36, 37, 38, . . . , 67}, etc. This constrained condition may be signaled in PPS, SPS, picture header, slice header, CTU-level syntax, or implicitly derived depends on other syntax, or always applied. For still another example, if the constrained condition is signaled, the CUS coded with DIMD/TIMD process may examine less candidate intra angular modes to derive the final intra angular mode for coding the current block.

D. Refining TIMD Intra Prediction

In some embodiments, after producing an intra prediction by TIMD based on an intra angular mode, the TIMD-derived intra prediction is further refined by the gradient of neighboring reconstruction samples.

Figure 5:
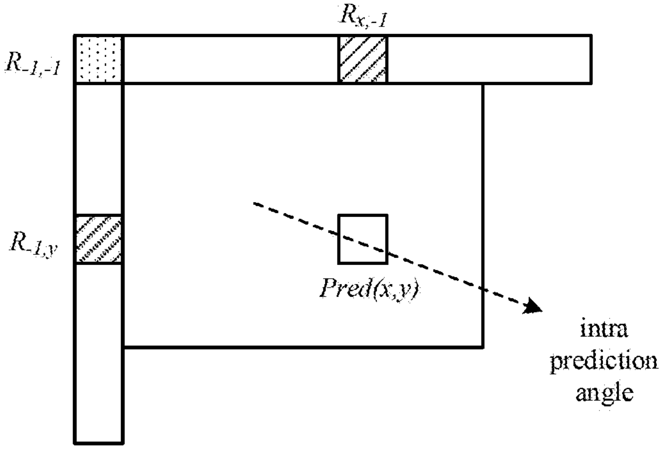
FIG. 5 conceptually illustrates refining TIMD intra prediction by gradient of neighboring reconstruction samples.

FIG. 5 conceptually illustrates refining TIMD intra prediction by gradient of neighboring reconstruction samples. As illustrated, for a current block 500, if the current intra prediction is from the left-side neighboring reconstruction samples, the current prediction at (x, y) is further refined by the gradient between the above-left corner sample (e.g., $R_{-1,-1}$) and the current left neighboring sample (e.g., $R_{-1,y}$). Then, the refined prediction at (x, y) is $$(w_1 \times (R_{x,-1} + (R_{-1,-1} - R_{-1,y})) + w_2 \times pred(x, y))/(w_1 + w_2).$$

For still another example, if the current intra prediction is from the above-side neighboring reconstruction samples, the current prediction at (x, y) is further refined by the gradient between the above-left corner sample (e.g., $R_{-1,-1}$) and the current above neighboring sample (e.g., $R_{x,-1}$). Then, the refined prediction at (x, y) is $$(w_1 \times (R_{-1,y} + (R_{-1,-1} - R_{x,-1})) + w_2 \times pred(x, y))/(w_1 + w_2).$$

E. Using DIMD as Pre-Processing for TIMD

In some embodiments, DIMD and TIMD prediction processes are combined to derive the final intra angular mode for coding the current block. In some embodiments, the neighboring window positions of the current block is partitioned into multiple groups, and the DIMD process is performed to choose one group. The TIMD process is then performed to choose the final intra angular mode from the DIMD chosen group (of neighboring window positions). More generally, in some embodiments, the DIMD process is performed to derive some possible intra prediction modes, and then the TIMD process is performed to choose the final intra angular mode from the DIMD selected intra prediction modes or the neighboring modes of the DIMD selected intra prediction modes. In other words, the DIMD is used to pre-process the neighboring reconstructed samples of the current block to accelerate the TIMD process.

F. Template Size Reduction for TIMD

To reduce the required template buffer size in TIMD, the neighboring lines (i.e., the lines of samples surrounding the current block used to produce template) may have correlation with, or is determined based on, the number of samples in the current block (e.g., block size, block shape). In some embodiments, the number of neighboring lines is determined based on the current block size, or the side length of the current block. For example, if the current block size is less than or equal to k, then the number of neighboring lines is n. For another example, if the current block is a rectangular block (i.e., block width is not equal to block height), and the neighboring lines at long-side of the current block is s, and the neighboring lines at short-side of the current block is t, and s is not equal to t. In some embodiments, the number of neighboring lines depends on the smoothness of pixels of top/left neighboring reconstructed pixels. For example, if the variance of neighboring reconstructed pixels at a first side of the current block is higher than the variance of the neighboring reconstructed pixels at a second side of the current block, the number of neighboring lines of a first template at the first side may be greater than the number of neighboring lines of a second template at the second side.

In some embodiments, to reduce the template size for TIMD, the reference samples of the template (e.g., in the reference region 320 in FIG. 3) are not used. To compute the costs of the candidate intra modes for TIMD, the video coder uses the prediction angle to calculate the distortion/difference between the inner neighboring lines of the template and the outer neighboring lines of template.

Figure 6A:
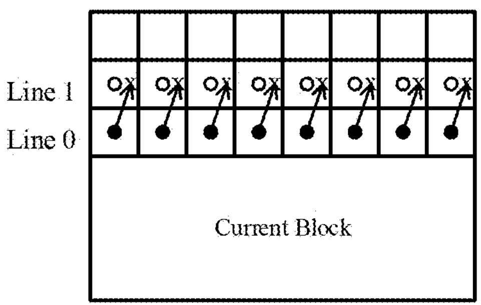
FIGS. 6A-6B illustrate examples of using different lines of the templates to calculate the costs of candidate intra modes for TIMD.
Figure 6A:
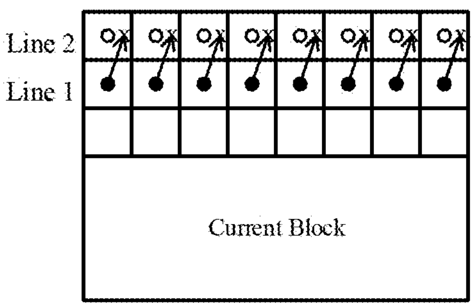
Figure 6B:
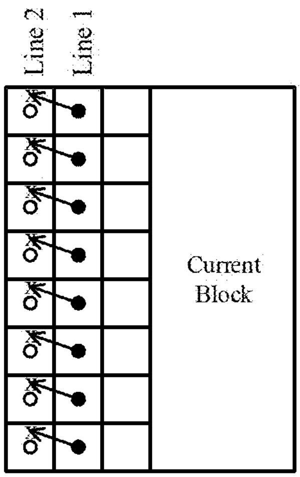

FIGS. 6A-B illustrate examples of using different lines of the templates to calculate the costs of candidate intra modes for TIMD. The cost of each candidate intra mode is computed by comparing an inner line of samples versus interpolation samples of an outer line, where the interpolation samples are obtained by the candidate intra angular mode.

As illustrated in FIG. 6A, if a candidate intra mode A is greater than or equal to 34 and there 3 neighboring lines of above template, the cost is the sum of the SAD between the interpolated samples (samples interpolated according to the candidate intra mode A) in line 1 and the corresponding samples in line 0, and the SAD between the interpolated samples in line 2 and the corresponding samples in line 1.

As illustrated in FIG. 6B, if a candidate intra mode B is less than 34 and there are 3 neighboring lines of left template, the cost is the sum of the SAD between the interpolated samples (samples interpolated according to the candidate intra mode B) in line 1 and the corresponding samples in line 0, and the SAD between the interpolated samples in line 2 and the corresponding samples in line 1.

Any of the foregoing proposed methods can be implemented in encoders and/or decoders. For example, any of the proposed methods can be implemented in an inter/intra/prediction module of an encoder, and/or an inter/intra/prediction module of a decoder. Alternatively, any of the proposed methods can be implemented as a circuit coupled to the inter/intra/prediction module of the encoder and/or the inter/intra/prediction module of the decoder, so as to provide the information needed by the inter/intra/prediction module.

V. Example Video Encoder

Figure 7:
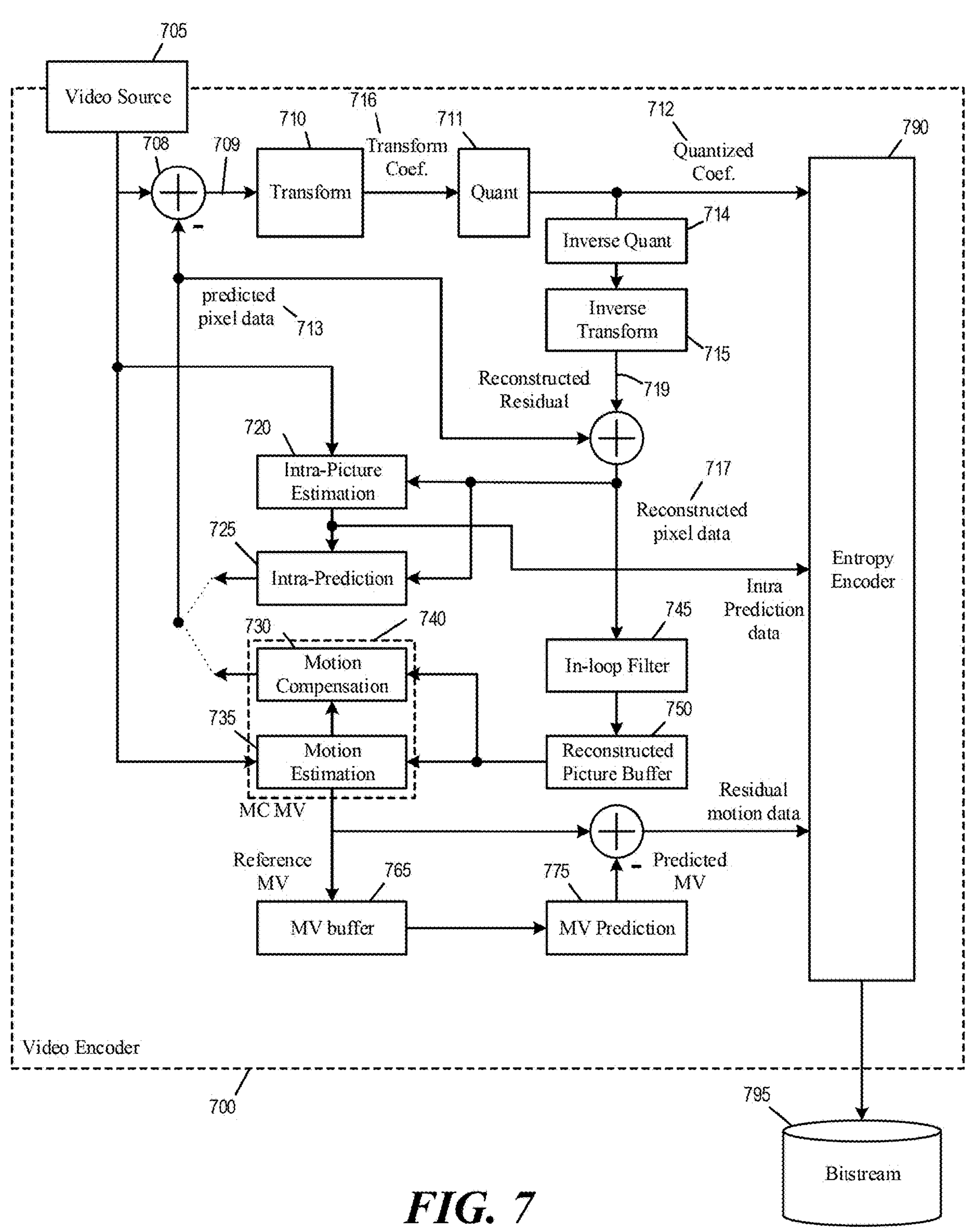
FIG. 7 illustrates an example video encoder that supports TIMD intra-prediction.

FIG. 7 illustrates an example video encoder 700 that supports TIMD intra-prediction. As illustrated, the video encoder 700 receives input video signal from a video source 705 and encodes the signal into bitstream 795. The video encoder 700 has several components or modules for encoding the signal from the video source 705, at least including some components selected from a transform module 710, a quantization module 711, an inverse quantization module 714, an inverse transform module 715, an intra-picture estimation module 720, an intra-prediction module 725, a motion compensation module 730, a motion estimation module 735, an in-loop filter 745, a reconstructed picture buffer 750, a MV buffer 765, and a MV prediction module 775, and an entropy encoder 790. The motion compensation module 730 and the motion estimation module 735 are part of an inter-prediction module 740.

In some embodiments, the modules 710-790 are modules of software instructions being executed by one or more processing units (e.g., a processor) of a computing device or electronic apparatus. In some embodiments, the modules 710-790 are modules of hardware circuits implemented by one or more integrated circuits (ICs) of an electronic apparatus. Though the modules 710-790 are illustrated as being separate modules, some of the modules can be combined into a single module.

The video source 705 provides a raw video signal that presents pixel data of each video frame without compression. A subtractor 708 computes the difference between the raw video pixel data of the video source 705 and the predicted pixel data 713 from the motion compensation module 730 or intra-prediction module 725 as prediction residual 709. The transform module 710 converts the difference (or the residual pixel data or residual signal 708) into transform coefficients (e.g., by performing Discrete Cosine Transform, or DCT). The quantization module 711 quantizes the transform coefficients into quantized data (or quantized coefficients) 712, which is encoded into the bitstream 795 by the entropy encoder 790.

The inverse quantization module 714 de-quantizes the quantized data (or quantized coefficients) 712 to obtain transform coefficients, and the inverse transform module 715 performs inverse transform on the transform coefficients to produce reconstructed residual 719. The reconstructed residual 719 is added with the predicted pixel data 713 to produce reconstructed pixel data 717. In some embodiments, the reconstructed pixel data 717 is temporarily stored in a line buffer (not illustrated) for intra-picture prediction and spatial MV prediction. The reconstructed pixels are filtered by the in-loop filter 745 and stored in the reconstructed picture buffer 750. In some embodiments, the reconstructed picture buffer 750 is a storage external to the video encoder 700. In some embodiments, the reconstructed picture buffer 750 is a storage internal to the video encoder 700.

The intra-picture estimation module 720 performs intra-prediction based on the reconstructed pixel data 717 to produce intra prediction data. The intra-prediction data is provided to the entropy encoder 790 to be encoded into bitstream 795. The intra-prediction data is also used by the intra-prediction module 725 to produce the predicted pixel data 713.

The motion estimation module 735 performs inter-prediction by producing MVs to reference pixel data of previously decoded frames stored in the reconstructed picture buffer 750. These MVs are provided to the motion compensation module 730 to produce predicted pixel data.

Instead of encoding the complete actual MVs in the bitstream, the video encoder 700 uses MV prediction to generate predicted MVs, and the difference between the MVs used for motion compensation and the predicted MVs is encoded as residual motion data and stored in the bitstream 795.

The MV prediction module 775 generates the predicted MVs based on reference MVs that were generated for encoding previously video frames, i.e., the motion compensation MVs that were used to perform motion compensation. The MV prediction module 775 retrieves reference MVs from previous video frames from the MV buffer 765. The video encoder 700 stores the MVs generated for the current video frame in the MV buffer 765 as reference MVs for generating predicted MVs.

The MV prediction module 775 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 795 by the entropy encoder 790.

The entropy encoder 790 encodes various parameters and data into the bitstream 795 by using entropy-coding techniques such as context-adaptive binary arithmetic coding (CABAC) or Huffman encoding. The entropy encoder 790 encodes various header elements, flags, along with the quantized transform coefficients 712, and the residual motion data as syntax elements into the bitstream 795. The bitstream 795 is in turn stored in a storage device or transmitted to a decoder over a communications medium such as a network.

The in-loop filter 745 performs filtering or smoothing operations on the reconstructed pixel data 717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 8:
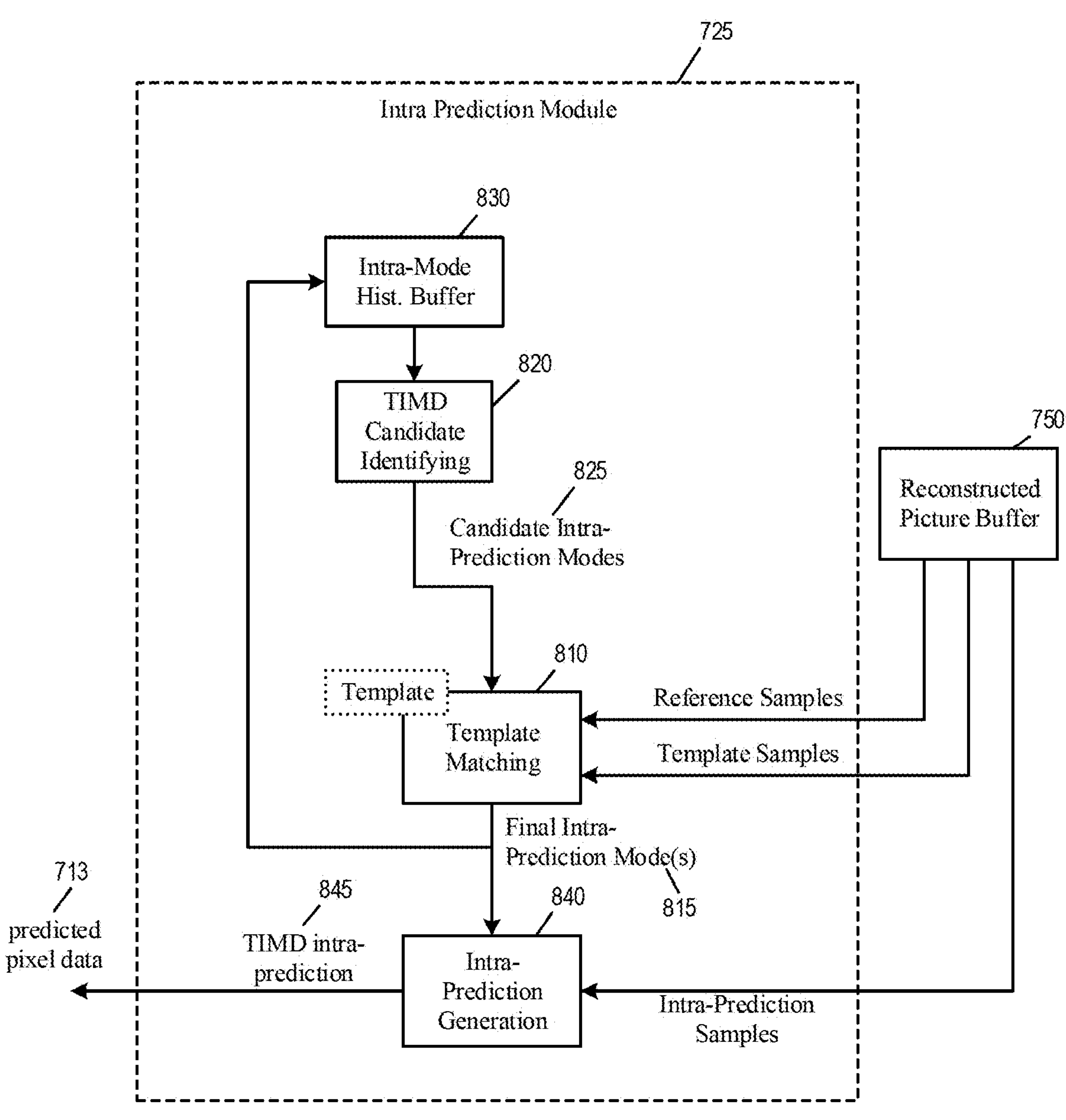
FIG. 8 illustrates portions of the video encoder that implement TIMD with enhanced list of candidate intra-prediction modes.

FIG. 8 illustrates portions of the video encoder 700 that implement TIMD with enhanced list of candidate intra-prediction modes. Specifically, the figure illustrates the components of the intra-prediction module 725 of the video encoder 700. As illustrated, the intra-prediction module 725 includes a template matching module 810, a TIMD candidate identifying module 820, an intra-mode historical buffer 830, and an intra-prediction generation module 840. The intra-prediction module 725 may use these modules to perform TIMD intra-prediction for both luma and chroma components.

As illustrated, the template matching module 810 constructs a template (e.g., the template region 420) for the current block based on template samples provided by the encoded picture buffer 750. The template is matched with reference samples (e.g., the reference region 430) provided by the encoded picture buffer 750 at different candidate intra-prediction modes 825. (In some embodiments, inner template samples are matched with outer template samples at different candidate intra-prediction modes.) The template matching module 810 would compute a matching cost for each of the candidate intra-prediction modes based on the template and the reference samples, then identify one or more final intra prediction mode(s) 815 for the TIMD process.

The candidate intra-prediction modes 825 are specified by the TIMD candidate identifying module 820, which may identify a set of MPMs based on intra-prediction modes used by neighboring blocks (which may be stored in an intra-mode history buffer 830). In some embodiments, the TIMD candidate identifying module 820 may perform the DIMD process to identify at least some of the candidate intra-prediction modes 825 (e.g., based on the DIMD histogram of different intra modes.) The TIMD candidate identifying module 820 may also add additional intra-prediction modes (e.g., adjacent modes of the MPM modes) to the candidate intra-prediction modes 825. The TIMD candidate identifying module 820 may also constrain the candidate intra-prediction modes by e.g., limiting the candidate intra-prediction modes 825 to certain directional/angular range or to exclude certain intra-prediction modes. In some embodiments, the TIMD candidate identifying module 820 may also check the variance of the candidate intra-prediction modes 825 to determine whether to enable the template matching module 810.

The final intra prediction mode(s) 815 of the TIMD process are used by the intra-prediction generation module 840 to generate TIMD intra-prediction 845 to be used as the predicted pixel data 713 for the current block (based on content of the reconstructed picture buffer 750.) The intra-prediction generation module 840 may refine the final intra-prediction modes 815 before using it to generate the predicted pixel data 713. The intra-prediction generation module 840 may also refine the generated TIMD intra-prediction 845 based on the gradient of neighboring blocks. The intra-prediction generation module 840 may blend/fuse multiple predictions/predictors based on multiple final intra prediction modes into one TIMD intra-prediction 845 for the current block.

Figure 9:
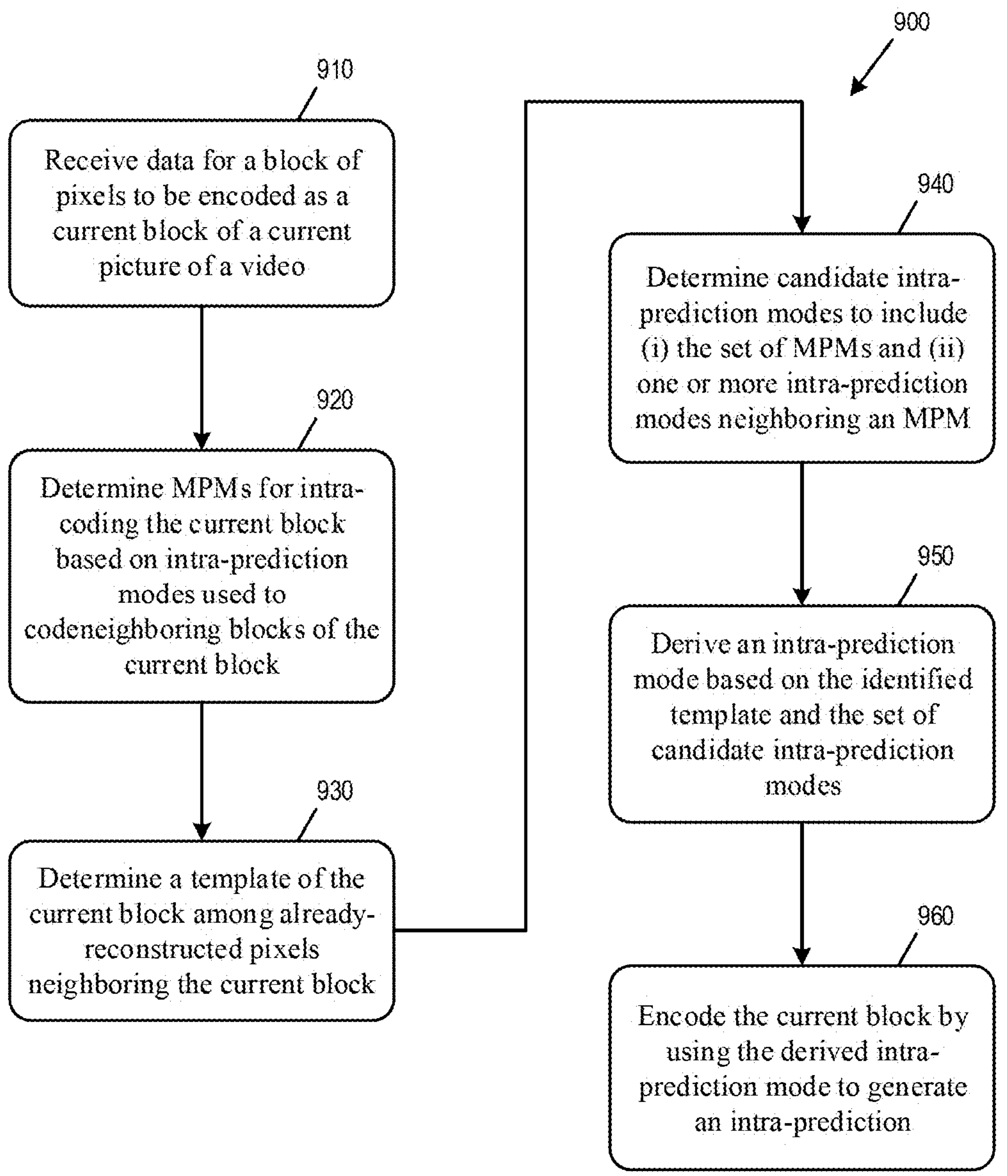
FIG. 9 conceptually illustrates a process for performing TIMD with enhanced list of candidate intra-prediction modes.

FIG. 9 conceptually illustrates a process 900 for performing TIMD with enhanced list of candidate intra-prediction modes. In some embodiments, one or more processing units (e.g., a processor) of a computing device implementing the encoder 700 performs the process 900 by executing instructions stored in a computer readable medium. In some embodiments, an electronic apparatus implementing the encoder 700 performs the process 900.

The encoder receives (at block 910) data to be encoded as a current block of pixels in a current picture of a video.

The encoder determines (at block 920) a set of most probable modes (MPMs) for intra-coding the current block based on intra-prediction modes used to code neighboring blocks (e.g., above and left) of the current block. The encoder determines (at block 930) a template of the current block among already-reconstructed pixels neighboring the current block.

In some embodiments, the video implicitly determines whether to perform TIMD to derive the intra-prediction based on whether a statistical variation of the set of MPMs is greater than a threshold. In some embodiments, the encoder would not perform TIMD (hence ending the process 900) if the statistical variation of the MPMs is less than a threshold.

The encoder determines (at block 940) a set of candidate intra-prediction modes to include (i) the set of MPMs and (ii) one or more intra-prediction modes neighboring an MPM in the set of MPMs. In some embodiments, the one or more intra-prediction modes neighboring an MPM are included in the set of candidate intra-prediction modes when the current block is greater than a threshold size. In some embodiments, the one or more intra-prediction modes neighboring an MPM are not included in the set of candidate intra-prediction modes when the current block is less than the threshold size. In some embodiments, the one of more intra-prediction modes neighboring an MPM are included in the set of candidate intra-prediction modes when a statistical variation of the set of MPMs is less than a threshold value. In some embodiments, the encoder derives a histogram of gradients for different intra prediction angles based on gradient amplitudes at different pixel positions along reconstructed pixels neighboring the current block, and the set of candidate intra-prediction modes includes modes identified by using the derived histogram. (In other words, the video encoder performs DIMD as preprocessing to identify candidate intra-prediction modes for TIMD.)

In some embodiments, the set of candidate intra-prediction modes is constrained to exclude one or more intra-prediction modes based on a prediction mode of a neighboring block of the current block. In some embodiments, the set of candidate intra-prediction modes is constrained to be within a predefined range.

The encoder derives (at block 950) an intra-prediction mode based on the determined template and the set of candidate intra-prediction modes, which specify intra-prediction directions.

The encoder encodes (at block 960) the current block by using the derived intra-prediction mode to generate an intra-prediction. The intra-prediction may be for luma or chroma components. In some embodiments, the video encoder refines the derived intra-prediction mode and uses the refined intra-prediction mode to generate the intra-prediction. In some embodiments, the video encoder refines the generated intra-prediction according to gradient of reconstructed samples neighboring the current block.

VI. Example Video Decoder

In some embodiments, an encoder may signal (or generate) one or more syntax element in a bitstream, such that a decoder may parse said one or more syntax element from the bitstream.

Figure 10:
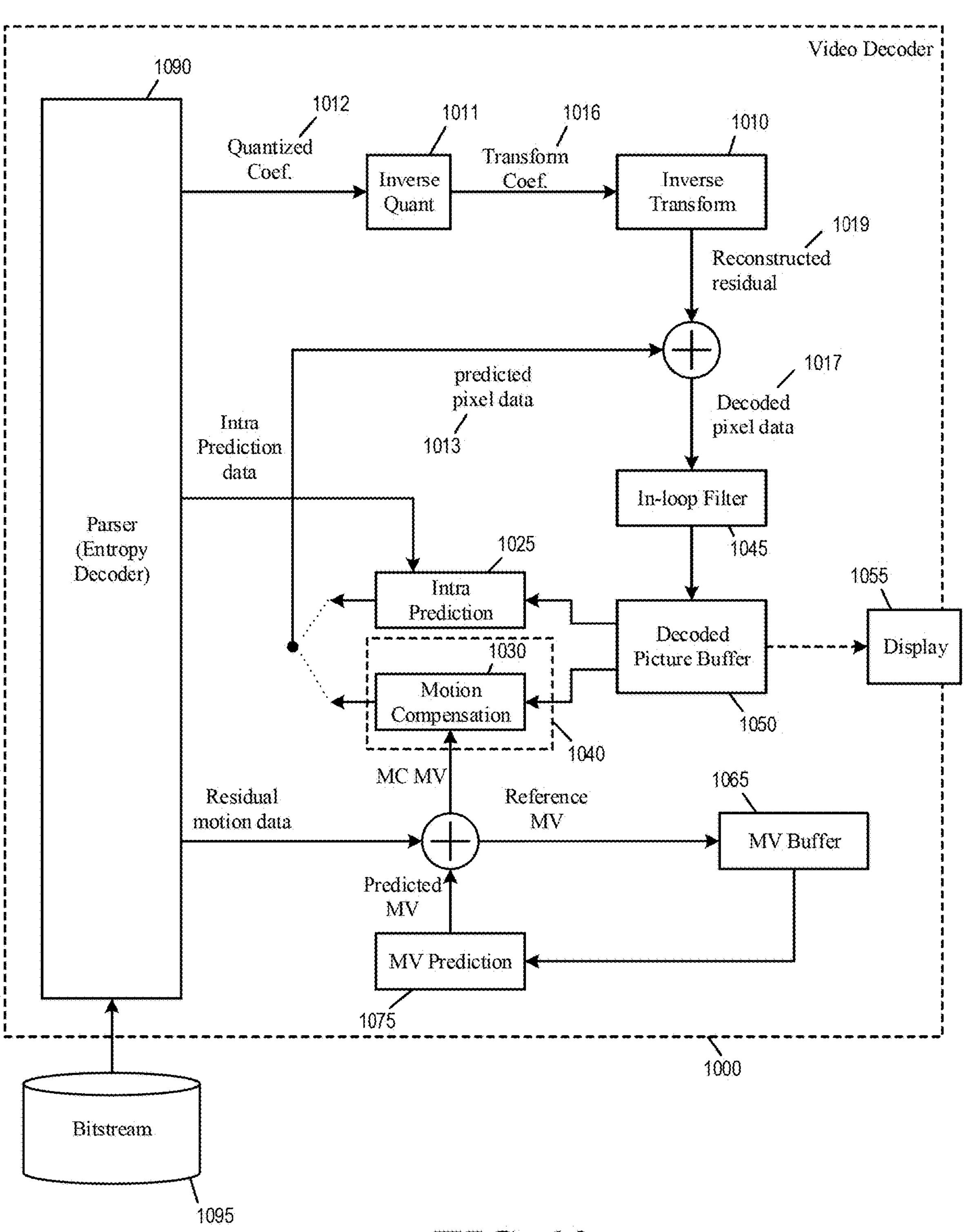
FIG. 10 illustrates an example video decoder supports TIMD intra-prediction.

FIG. 10 illustrates an example video decoder 1000 supports TIMD intra-prediction. As illustrated, the video decoder 1000 is an image-decoding or video-decoding circuit that receives a bitstream 1095 and decodes the content of the bitstream into pixel data of video frames for display. The video decoder 1000 has several components or modules for decoding the bitstream 1095, including some components selected from an inverse quantization module 1011, an inverse transform module 1010, an intra-prediction module 1025, a motion compensation module 1030, an in-loop filter 1045, a decoded picture buffer 1050, a MV buffer 1065, a MV prediction module 1075, and a parser 1090. The motion compensation module 1030 is part of an inter-prediction module 1040.

In some embodiments, the modules 1010-1090 are modules of software instructions being executed by one or more processing units (e.g., a processor) of a computing device. In some embodiments, the modules 1010-1090 are modules of hardware circuits implemented by one or more ICs of an electronic apparatus. Though the modules 1010-1090 are illustrated as being separate modules, some of the modules can be combined into a single module.

The parser 1090 (or entropy decoder) receives the bitstream 1095 and performs initial parsing according to the syntax defined by a video-coding or image-coding standard. The parsed syntax element includes various header elements, flags, as well as quantized data (or quantized coefficients) 1012. The parser 1090 parses out the various syntax elements by using entropy-coding techniques such as context-adaptive binary arithmetic coding (CABAC) or Huffman encoding.

The inverse quantization module 1011 de-quantizes the quantized data (or quantized coefficients) 1012 to obtain transform coefficients, and the inverse transform module 1010 performs inverse transform on the transform coefficients 1016 to produce reconstructed residual signal 1019. The reconstructed residual signal 1019 is added with predicted pixel data 1013 from the intra-prediction module 1025 or the motion compensation module 1030 to produce decoded pixel data 1017. The decoded pixels data are filtered by the in-loop filter 1045 and stored in the decoded picture buffer 1050. In some embodiments, the decoded picture buffer 1050 is a storage external to the video decoder 1000. In some embodiments, the decoded picture buffer 1050 is a storage internal to the video decoder 1000.

The intra-prediction module 1025 receives intra-prediction data from bitstream 1095 and according to which, produces the predicted pixel data 1013 from the decoded pixel data 1017 stored in the decoded picture buffer 1050. In some embodiments, the decoded pixel data 1017 is also stored in a line buffer (not illustrated) for intra-picture prediction and spatial MV prediction.

In some embodiments, the content of the decoded picture buffer 1050 is used for display. A display device 1055 either retrieves the content of the decoded picture buffer 1050 for display directly, or retrieves the content of the decoded picture buffer to a display buffer. In some embodiments, the display device receives pixel values from the decoded picture buffer 1050 through a pixel transport.

The motion compensation module 1030 produces predicted pixel data 1013 from the decoded pixel data 1017 stored in the decoded picture buffer 1050 according to motion compensation MVs (MC MVs). These motion compensation MVs are decoded by adding the residual motion data received from the bitstream 1095 with predicted MVs received from the MV prediction module 1075.

The MV prediction module 1075 generates the predicted MVs based on reference MVs that were generated for decoding previous video frames, e.g., the motion compensation MVs that were used to perform motion compensation. The MV prediction module 1075 retrieves the reference MVs of previous video frames from the MV buffer 1065. The video decoder 1000 stores the motion compensation MVs generated for decoding the current video frame in the MV buffer 1065 as reference MVs for producing predicted MVs.

The in-loop filter 1045 performs filtering or smoothing operations on the decoded pixel data 1017 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 11:
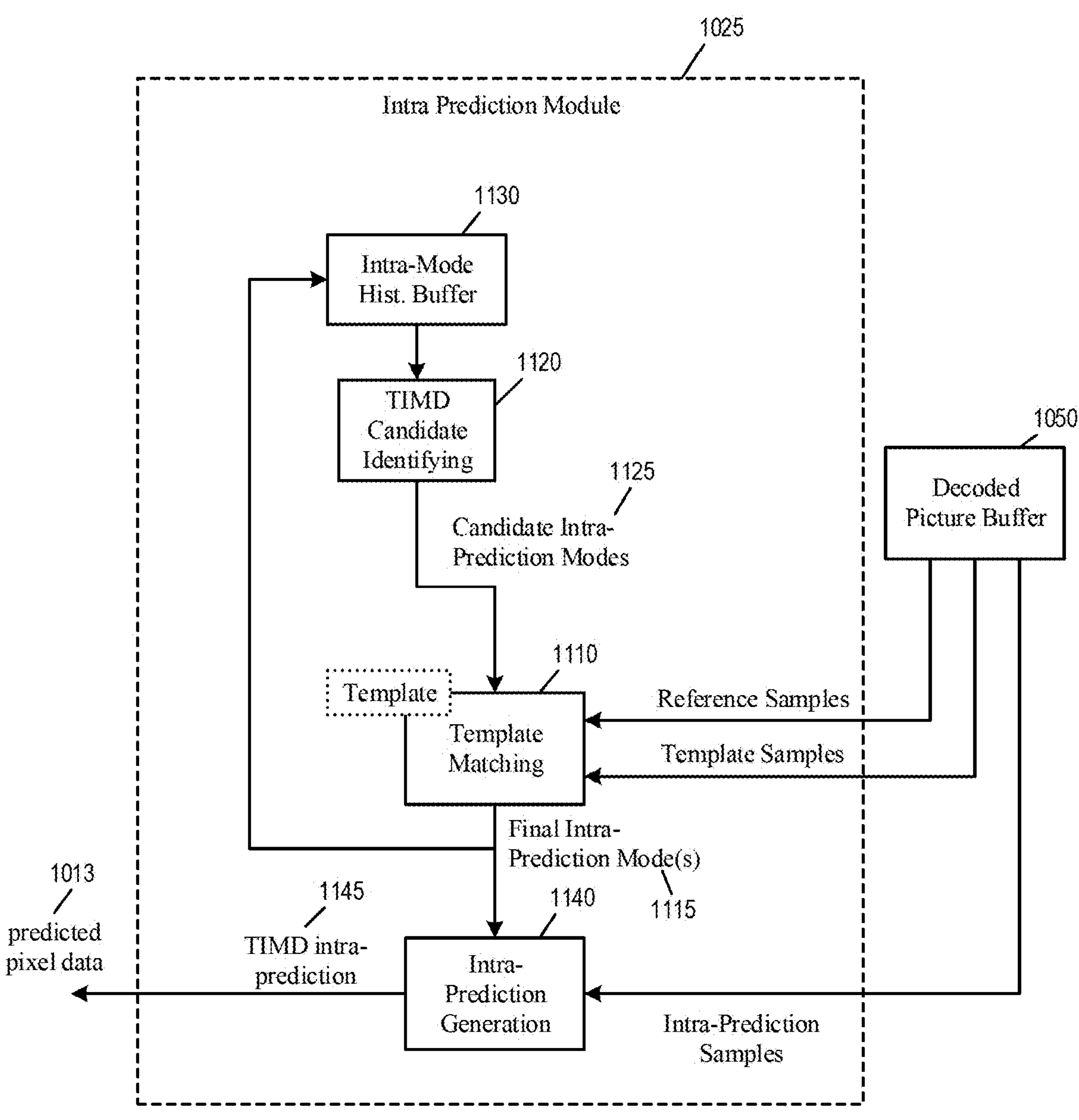
FIG. 11 illustrates portions of the video decoder that implement TIMD with enhanced list of candidate intra-prediction modes.

FIG. 11 illustrates portions of the video decoder 1000 that implement TIMD with enhanced list of candidate intra-prediction modes. Specifically, the figure illustrates the components of the intra-prediction module 1025 of the video decoder 1000. As illustrated, the intra-prediction module 1025 includes a template matching module 1110, a TIMD candidate identifying module 1120, an intra-mode historical buffer 1130, and an intra-prediction generation module 1140. The intra-prediction module 1025 may use these modules to perform TIMD intra-prediction for both luma and chroma components.

As illustrated, the template matching module 1110 constructs a template (e.g., the template region 420) for the current block based on template samples provided by the decoded picture buffer 1050. The template is matched with reference samples (e.g., the reference region 430) provided by the decoded picture buffer 1050 at different candidate intra-prediction modes 1125. (In some embodiments, inner template samples are matched with outer template samples at different candidate intra-prediction modes.) The template matching module 1110 would compute a matching cost for each of the candidate intra-prediction modes based on the template and the reference samples, then identify one or more final intra prediction mode(s) 1115 for the TIMD process.

The candidate intra-prediction modes 1125 are specified by the TIMD candidate identifying module 1120, which may identify a set of MPMs based on intra-prediction modes used by neighboring blocks (which may be stored in an intra-mode history buffer 1130). In some embodiments, the TIMD candidate identifying module 1120 may perform the DIMD process to identify at least some of the candidate intra-prediction modes 1125 (e.g., based on the DIMD histogram of different intra modes.) The TIMD candidate identifying module 1120 may also add additional intra-prediction modes (e.g., adjacent modes of the MPM modes) to the candidate intra-prediction modes 1125. The TIMD candidate identifying module 1120 may also constrain the candidate intra-prediction modes by e.g., limiting the candidate intra-prediction modes 1125 to certain directional/angular range or to exclude certain intra-prediction modes. In some embodiments, the TIMD candidate identifying module 1120 may also check the variance of the candidate intra-prediction modes 1125 to determine whether to enable the template matching module 1110.

The final intra prediction mode(s) 1115 of the TIMD process are used by the intra-prediction generation module 1140 to generate TIMD intra-prediction 1145 to be used as the predicted pixel data 1013 for the current block (based on content of the decoded picture buffer 1050.) The intra-prediction generation module 1140 may refine the final intra-prediction modes 1115 before using it to generate the predicted pixel data 1013. The intra-prediction generation module 1140 may also refine the generated TIMD intra-prediction 1145 based on the gradient of neighboring blocks. The intra-prediction generation module 1140 may blend/fuse multiple predictions/predictors based on multiple final intra prediction modes into one TIMD intra-prediction 1145 for the current block.

Figure 12:
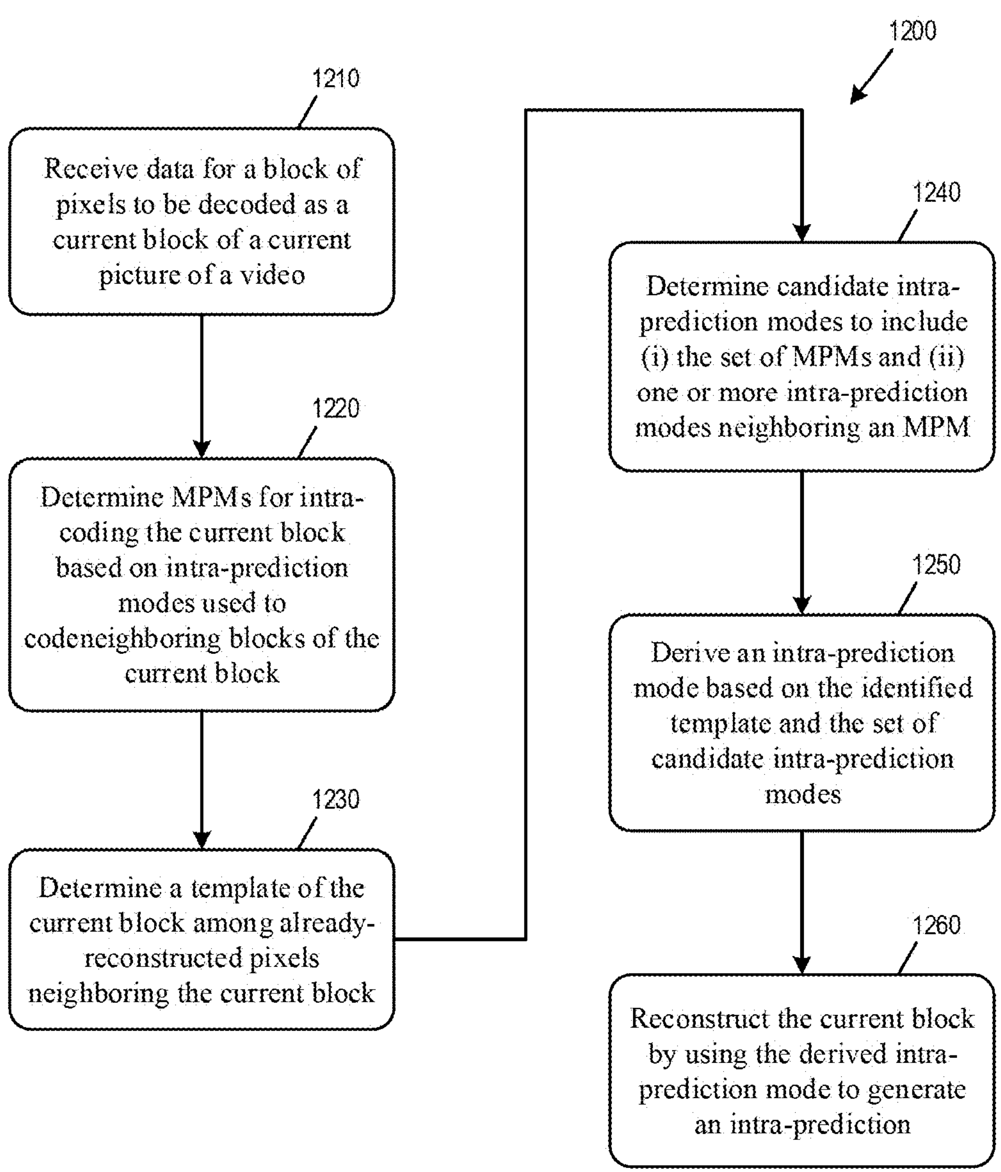
FIG. 12 conceptually illustrates a process for performing TIMD with enhanced list of candidate intra-prediction modes.

FIG. 12 conceptually illustrates a process 1200 for performing TIMD with enhanced list of candidate intra-prediction modes. In some embodiments, one or more processing units (e.g., a processor) of a computing device implementing the decoder 1000 performs the process 1200 by executing instructions stored in a computer readable medium. In some embodiments, an electronic apparatus implementing the decoder 700 performs the process 1200.

The decoder receives (at block 1210) data to be decoded as a current block of pixels in a current picture of a video.

The decoder determines (at block 1220) a set of most probable modes (MPMs) for intra-coding the current block based on intra-prediction modes used to code neighboring blocks (e.g., above and left) of the current block. The decoder determines (at block 1230) a template of the current block among already-reconstructed pixels neighboring the current block.

In some embodiments, the video implicitly determines whether to perform TIMD to derive the intra-prediction based on whether a statistical variation of the set of MPMs is greater than a threshold. In some embodiments, the decoder would not perform TIMD (hence ending the process 1200) if the statistical variation of the MPMs is less than a threshold.

The decoder determines (at block 1240) a set of candidate intra-prediction modes to include (i) the set of MPMs and (ii) one or more intra-prediction modes neighboring an MPM in the set of MPMs. In some embodiments, the one or more intra-prediction modes neighboring an MPM are included in the set of candidate intra-prediction modes when the current block is greater than a threshold size. In some embodiments, the one or more intra-prediction modes neighboring an MPM are not included in the set of candidate intra-prediction modes when the current block is less than the threshold size. In some embodiments, the one of more intra-prediction modes neighboring an MPM are included in the set of candidate intra-prediction modes when a statistical variation of the set of MPMs is less than a threshold value. In some embodiments, the decoder derives a histogram of gradients for different intra prediction angles based on gradient amplitudes at different pixel positions along reconstructed pixels neighboring the current block, and the set of candidate intra-prediction modes includes modes identified by using the derived histogram. (In other words, the video decoder performs DIMD as preprocessing to identify candidate intra-prediction modes for TIMD.)

In some embodiments, the set of candidate intra-prediction modes is constrained to exclude one or more intra-prediction modes based on a prediction mode of a neighboring block of the current block. In some embodiments, the set of candidate intra-prediction modes is constrained to be within a predefined range.

The decoder derives (at block 1250) an intra-prediction mode based on the determined template and the set of candidate intra-prediction modes, which specify intra-prediction directions.

The decoder reconstructs (at block 1260) the current block by using the derived intra-prediction mode to generate an intra-prediction. The intra-prediction may be for luma or chroma components. In some embodiments, the video decoder refines the derived intra-prediction mode and uses the refined intra-prediction mode to generate the intra-prediction. In some embodiments, the video decoder refines the generated intra-prediction according to gradient of reconstructed samples neighboring the current block. The decoder may then provide the reconstructed current block for display as part of the reconstructed current picture.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 13:
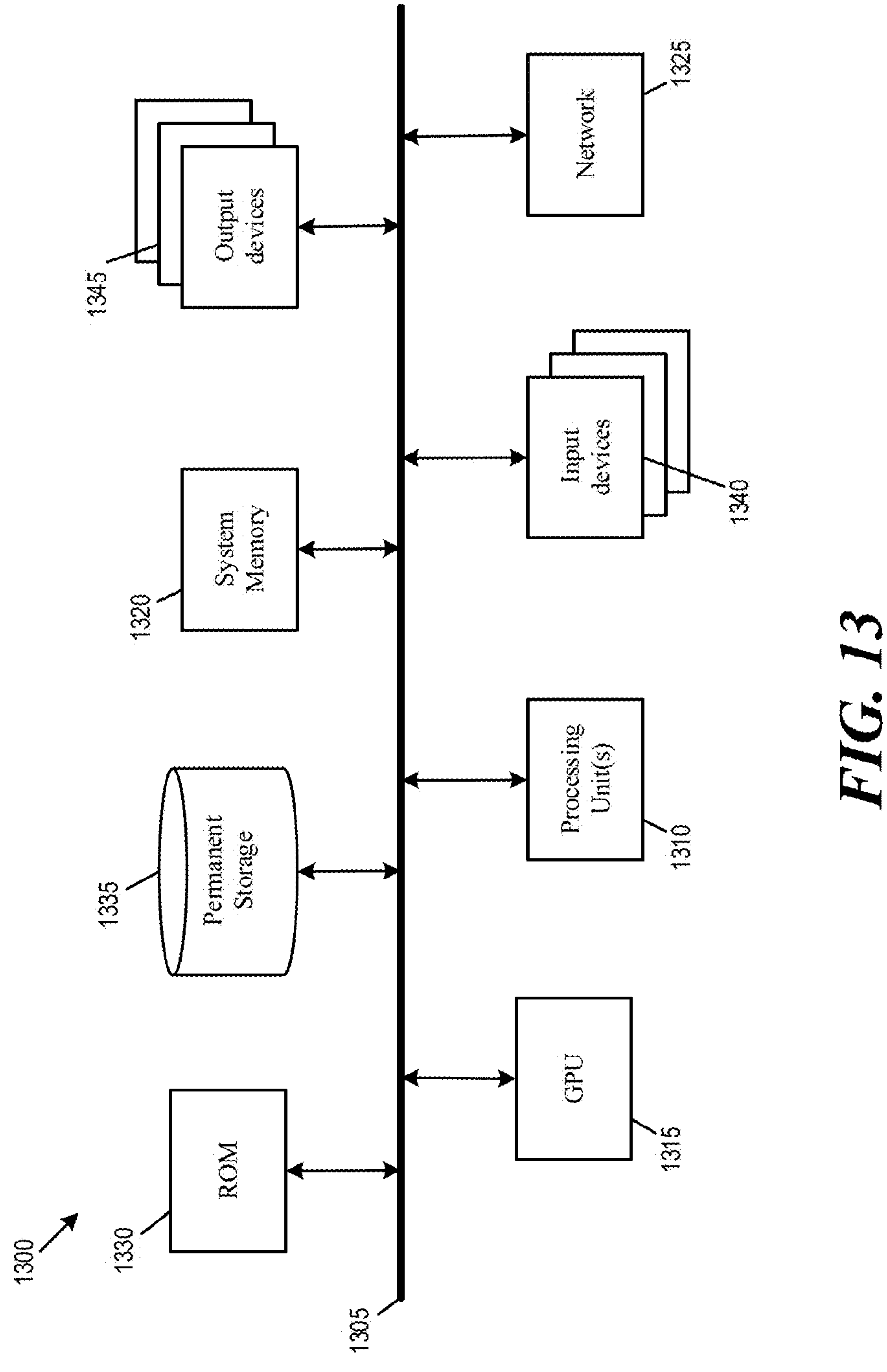
FIG. 13 conceptually illustrates an electronic system with which some embodiments of the present disclosure are implemented.

FIG. 13 conceptually illustrates an electronic system 1300 with which some embodiments of the present disclosure are implemented. The electronic system 1300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1300 includes a bus 1305, processing unit(s) 1310, a graphics-processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the GPU 1315, the read-only memory 1330, the system memory 1320, and the permanent storage device 1335.

From these various memory units, the processing unit(s) 1310 retrieves instructions to execute and data to process in order to execute the processes of the present disclosure. The processing unit(s) may be a single processor or a multi-core processor in different embodiments. Some instructions are passed to and executed by the GPU 1315. The GPU 1315 can offload various computations or complement the image processing provided by the processing unit(s) 1310.

The read-only-memory (ROM) 1330 stores static data and instructions that are used by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the present disclosure use a mass-storage device (such as a magnetic or optical disk and its corresponding disk drive) as the permanent storage device 1335.

Other embodiments use a removable storage device (such as a floppy disk, flash memory device, etc., and its corresponding disk drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor uses at runtime. In some embodiments, processes in accordance with the present disclosure are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 9 and FIG. 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data for a block of pixels to be encoded or decoded as a current block of a current picture of a video;

determining a set of most probable modes (MPMs) for intra-coding the current block based on intra-prediction modes used to code neighboring blocks of the current block;

determining a template of the current block among already-reconstructed pixels neighboring the current block;

determining a set of candidate intra-prediction modes to include (i) the set of MPMs and (ii) one or more intra-prediction modes neighboring an MPM in the set of MPMs;

deriving an intra-prediction mode based on the determined template and the set of candidate intra-prediction modes; and encoding or decoding the current block by using the derived intra-prediction mode to generate an intra-prediction.

2. The video coding method of claim 1, further comprising determining whether to use the template to derive the intra-prediction mode based on whether a statistical variation of the set of MPMs is greater than a threshold.

3. The video coding method of claim 1, wherein the one or more intra-prediction modes neighboring an MPM are included in the set of candidate intra-prediction modes when the current block is greater than a threshold size.

4. The video coding method of claim 3, wherein the one or more intra-prediction modes neighboring an MPM are not included in the set of candidate intra-prediction mode when the current block is less than the threshold size.

5. The video coding method of claim 1, wherein the one of more intra-prediction modes neighboring an MPM are included in the set of candidate intra-prediction modes when a statistical variation of the set of MPMs is less than a threshold value.

6. The video coding method of claim 1, further comprising deriving a histogram of gradients for different intra prediction angles based on gradient amplitudes at different pixel positions along reconstructed pixels neighboring the current block, wherein the set of candidate intra-prediction modes comprises modes determined by using the derived histogram.

7. The video coding method of claim 1, wherein the current block is a block of chroma samples.

8. The video coding method of claim 1, further comprising refining the derived intra-prediction mode and using the refined intra-prediction mode to generate the intra-prediction to encode or decode the current block.

9. The video coding method of claim 1, wherein the set of candidate intra-prediction modes is constrained to exclude one or more intra-prediction modes based on a prediction mode of a neighboring block of the current block.

10. The video coding method of claim 1, wherein the set of candidate intra-prediction modes is constrained to be within a predefined range.

11. The video coding method of claim 1, further comprising refining the generated intra-prediction according to gradient of reconstructed samples neighboring the current block.

12. An electronic apparatus comprising:

a video coder circuit configured to perform operations comprising:

receiving data for a block of pixels to be encoded or decoded as a current block of a current picture of a video;

determining a set of most probable modes (MPMs) for intra-coding the current block based on intra-prediction modes used to code neighboring blocks of the current block;

determining a template of the current block among already-reconstructed pixels neighboring the current block;

determining a set of candidate intra-prediction modes to include (i) the set of MPMs and (ii) one or more intra-prediction modes neighboring an MPM in the set of MPMs;

deriving an intra-prediction mode based on the determined template and the set of candidate intra-prediction modes; and encoding or decoding the current block by using the derived intra-prediction mode to generate an intra-prediction.

13. A video decoding method comprising:

receiving data for a block of pixels to be decoded as a current block of a current picture of a video;

determining a set of most probable modes (MPMs) for intra-coding the current block based on intra-prediction modes used to code neighboring blocks of the current block;

determining a template of the current block among already-reconstructed pixels neighboring the current block;

determining a set of candidate intra-prediction modes to include (i) the set of MPMs and (ii) one or more intra-prediction modes neighboring an MPM in the set of MPMs;

deriving an intra-prediction mode based on the determined template and the set of candidate intra-prediction modes; and reconstructing the current block by using the derived intra-prediction mode to generate an intra-prediction.

14. A video encoding method comprising:

receiving data for a block of pixels to be encoded as a current block of a current picture of a video;

determining a set of most probable modes (MPMs) for intra-coding the current block based on intra-prediction modes used to code neighboring blocks of the current block;

determining a template of the current block among already-reconstructed pixels neighboring the current block;

determining a set of candidate intra-prediction modes to include (i) the set of MPMs and (ii) one or more intra-prediction modes neighboring an MPM in the set of MPMs;

deriving an intra-prediction mode based on the determined template and the set of candidate intra-prediction modes; and encoding the current block by using the derived intra-prediction mode to generate an intra-prediction.

* * * * *